(12) United States Patent
Ishida et al.

(10) Patent No.: US 9,544,476 B2
(45) Date of Patent: Jan. 10, 2017

(54) OMNIDIRECTIONAL CAMERA

(71) Applicant: Kabushiki Kaisha TOPCON, Tokyo-to (JP)

(72) Inventors: Takeshi Ishida, Tokyo-to (JP); Jun Sasagawa, Tokyo-to (JP); Tomohiro Abe, Tokyo-to (JP); Hirokazu Yamada, Tokyo-to (JP); Tetsuya Akimoto, Tokyo-to (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 350 days.

(21) Appl. No.: 14/097,802

(22) Filed: Dec. 5, 2013

(65) Prior Publication Data
US 2014/0160274 A1    Jun. 12, 2014

(30) Foreign Application Priority Data
Dec. 7, 2012    (JP) ................. 2012-268083

(51) Int. Cl.
| | |
|---|---|
| *H04N 5/232* | (2006.01) |
| *H04N 5/225* | (2006.01) |
| *G01S 19/14* | (2010.01) |
| *G03B 17/02* | (2006.01) |
| *G03B 17/24* | (2006.01) |
| *G03B 37/04* | (2006.01) |

(Continued)

(52) U.S. Cl.
CPC ............ *H04N 5/2251* (2013.01); *G01S 19/14* (2013.01); *G01S 19/36* (2013.01); *G03B 17/02* (2013.01); *G03B 17/24* (2013.01); *G03B 37/04* (2013.01); *H01Q 1/44* (2013.01); *H04N 5/23238* (2013.01); *G01S 19/49* (2013.01)

(58) Field of Classification Search
None
See application file for complete search history.

(56) References Cited

U.S. PATENT DOCUMENTS

| | | | |
|---|---|---|---|
| 7,982,665 B2 * | 7/2011 | Kumagai | ............... G01C 11/02 342/175 |
| 8,126,324 B2 | 2/2012 | Young et al. | |

(Continued)

FOREIGN PATENT DOCUMENTS

| | | |
|---|---|---|
| EP | 2154542 A1 | 2/2010 |
| JP | 2002-357422 A | 12/2002 |

(Continued)

OTHER PUBLICATIONS

European communication dated Apr. 8, 2014 in corresponding European patent application No. EP 13195805.

*Primary Examiner* — Dave Czekaj
*Assistant Examiner* — Tyler W Sullivan
(74) *Attorney, Agent, or Firm* — Nields, Lemack & Frame, LLC (57) ABSTRACT

An omnidirectional camera comprises a camera mounting frame of cylindrical hollow body, a plurality of horizontal camera units, each of which is provided on a horizontal plane orthogonal to a center line of the camera mounting frame and adapted to acquire an image in a horizontal direction. A vertical camera unit is provided so as to coincide with the center line of the camera mounting frame and adapted to acquire an image in a zenith direction. A ring-like GPS antenna is provided so as to surround the vertical camera unit.

5 Claims, 5 Drawing Sheets

(51) Int. Cl.
*G01S 19/36* (2010.01)
*H01Q 1/44* (2006.01)
*G01S 19/49* (2010.01)

(56) References Cited

U.S. PATENT DOCUMENTS

| | | | | |
|---|---|---|---|---|
| 8,306,747 | B1* | 11/2012 | Gagarin | G01C 7/04 |
| | | | | 701/408 |
| 8,339,394 | B1* | 12/2012 | Lininger | G06T 15/04 |
| | | | | 345/419 |
| 2010/0033371 | A1 | 2/2010 | Kumagai et al. | |
| 2010/0283832 | A1* | 11/2010 | Lin | G06K 9/3216 |
| | | | | 348/46 |
| 2011/0050903 | A1* | 3/2011 | Vorobiev | A01B 69/003 |
| | | | | 348/148 |
| 2012/0019661 | A1 | 1/2012 | Thomson | |
| 2012/0120069 | A1* | 5/2012 | Kodaira | G06F 17/30271 |
| | | | | 345/419 |
| 2014/0049636 | A1* | 2/2014 | O'Donnell | G08C 17/02 |
| | | | | 348/143 |
| 2014/0139730 | A1* | 5/2014 | White | B64D 47/08 |
| | | | | 348/373 |

FOREIGN PATENT DOCUMENTS

| | | |
|---|---|---|
| JP | 2010-38822 A | 2/2010 |
| WO | 02/065786 A1 | 8/2002 |

\* cited by examiner

PITCH ANGLE

FIG.5B

ROLL ANGLE

FIG. 6

OMNIDIRECTIONAL CAMERA

BACKGROUND OF THE INVENTION

The present invention relates to an omnidirectional camera which takes images of an omnidirectional landscape by a plurality of cameras and which measures a position where images are taken.

In recent years, with spread of a navigation system, not only a positional information as an information of an electronic map but also an image information of a target, a building, a construction, and a landscape around a road or the like are required. Therefore, a measurement for acquiring a positional data as a map information is carried out by using a GPS (Global Positioning System) and, at the same time, an image data is acquired by using an omnidirectional camera.

In recent years, there has been developed a data collection system in which a GPS is mounted in a movable vehicle such as a vehicle, a camera or a laser surveying device (a laser scanner) is mounted, a three-dimensional data of a construction or a building in urban space is collected and images are also collected, and this data collection system is made good use of the preparation of a map data to be used for car navigation and other purposes.

However, in a case of a conventional system, a GPS antenna and a camera are independently provided, there is a problem corresponding to an arrangement of the GPS antenna.

For example, in a case where the GPS antenna is provided near and above the camera, this arrangement is ideal for receiving a GPS signal, but the GPS antenna itself is reflected in the camera which takes images in a zenith direction, which obstructs a photographing of a landscape behind the GPS antenna.

In the case described above, since the GPS antenna is positioned near the camera and a relative positional displacement hardly occurs, a relative positional relationship can be calculated based on an initial design value, but the positional relationship between both the GPS antenna and the camera is apt to vary due to an error caused at a time of an installation.

In a case where the GPS antenna is provided above the camera via a pole at a position apart from the camera, there is no problem in receiving the GPS signal, but the GPS antenna and the pole supporting the GPS antenna are reflected in the camera, which obstructs a viewing field.

Also, in a case where the GPS antenna is provided below the camera at a position apart from the camera, since the GPS antenna is positioned below the system, components and devices, e.g. a camera and others may be an obstacle at a time of receiving a GPS signal.

Further, in the case described above, the GPS antenna is separated from the camera, and the GPS antenna and the camera are individually installed at the time of the installation. Therefore, a displacement occurs due to an installation error every time. Accordingly, a distance between the GPS antenna and the camera is measured every time the installation is carried out, and then a relative positional relationship is calculated based on a position of the GPS antenna on a photographed image. Therefore, a positional relationship between the GPS antenna and the camera is apt to vary due to a measurement error of a distance between the GPS antenna and the camera or a measurement error of the GPS antenna position on an image and so on.

Further, in a position measurement by using the GPS, in a case where the receiving of the GPS signal is interrupted because of a state of being in a shade of a building or a mountain or the like, a self-position cannot be determined. Therefore, an inertial measurement unit (IMU) is mounted, and the position measurement using the IMU is carried out while the position measurement cannot be carried out by using the GPS. In this case, the IMU is installed at a position apart from the camera. For example, the IMU is installed at a position that is several tens of centimeters apart from the camera.

Also, in a case where the omnidirectional camera is mounted on a ceiling portion of a vehicle and a map data is acquired, when the vehicle with the camera decelerates, the vehicle tilts forward at a pitch angle corresponding to an acceleration around pitch center as a center and when the vehicle turns, e.g. in a counterclockwise direction, the vehicle tilts toward a right side at a roll angle corresponding to the acceleration around roll center as a center. Therefore, in a case where the pitch center or the roll center is provided in a lower portion of the vehicle and the camera and the IMU are disposed at positions apart from each other, when the vehicle accelerates/decelerates or turns, the IMU receives an acceleration different from an acceleration of the camera, and there is a problem that an accurate position of the camera cannot be determined.

It is noted that JP-A-2010-38822 discloses an omnidirectional camera with a GPS and a spatial data collection device that prevent deviation of a reference position of a GPS antenna and a reference position of an image and enable acquisition of images in all directions except an upper direction even when the reference position of the GPS antenna is adjusted to coincide with the image reference position of the camera and a direction of a vehicle changes or the vehicle is inclined.

SUMMARY OF THE INVENTION

It is an object of the present invention to provide an omnidirectional camera that can acquire omnidirectional images without deficiency and improve a measurement accuracy of positional information based on a GPS signal.

To attain the above object, an omnidirectional camera according to the present invention comprises a camera mounting frame of cylindrical hollow body, a plurality of horizontal camera units each of which is provided on a horizontal plane orthogonal to a center line of the camera mounting frame and adapted to acquire an image in a horizontal direction, a vertical camera unit provided so as to coincide with the center line of the camera mounting frame and adapted to acquire an image in a zenith direction, and a ring-like GPS antenna provided so as to surround the vertical camera unit.

Further, in the omnidirectional camera according to the present invention, the plurality of horizontal camera units, the vertical camera unit, and the GPS antenna are arranged in such a manner that image centers of the plurality of horizontal camera units, an image center of the vertical camera unit, and a phase center of the GPS antenna are positioned on the center line of the camera mounting frame together.

Further, the omnidirectional camera according to the present invention further comprises an inertial measurement unit provided near the image centers of the plurality of horizontal camera units and the vertical camera unit.

Further, the omnidirectional camera according to the present invention further comprises a positional information receiving unit that calculates a coordinate of the phase center of the GPS antenna based on a GPS signal received by the GPS antenna.

According to the present invention, the omnidirectional camera comprises a camera mounting frame of cylindrical hollow body, a plurality of horizontal camera units each of which is provided on the horizontal plane orthogonal to a center line of the camera mounting frame and adapted to acquire an image in a horizontal direction, a vertical camera unit provided so as to coincide with the center line of the camera mounting frame and adapted to acquire an image in a zenith direction, and a ring-like GPS antenna provided so as to surround the vertical camera unit. As a result, it can be prevented that other members, e.g. the GPS antenna or the like are reflected in the acquired images and obstruct a viewing field, and also a space for providing the GPS antenna does not have to be additionally provided, and the omnidirectional camera can be miniaturized.

Further, according to the present invention, in the omnidirectional camera, the plurality of horizontal camera units, the vertical camera unit, and the GPS antenna are arranged in such a manner that image centers of the plurality of horizontal camera units, an image center of the vertical camera unit, and a phase center of the GPS antenna are positioned on the center line of the camera mounting frame together. As a result, in a case where a mobile object that supports the horizontal camera units, the vertical camera unit, and the GPS antenna changes a direction of the mobile object, a deviation of the image centers and the phase center can be avoided.

Further, according to the present invention, the omnidirectional camera further comprises an inertial measurement unit provided near the image centers of the plurality of horizontal camera units and the vertical camera units. As a result, a difference between pitch angles of the horizontal camera units, the vertical camera unit, and the inertial measurement unit is reduced when a mobile object supporting the horizontal camera units, the vertical camera unit, and the inertial measurement unit accelerates/decelerates. A difference between roll angles of the horizontal camera units, the vertical camera unit, and the inertial measurement unit is reduced when the mobile object turns, and a measurement accuracy of the position information obtained by the inertial measurement unit can be improved.

Further, according to the present invention, the omnidirectional camera further comprises a positional information receiving unit that calculates a coordinate of the phase center of the GPS antenna based on a GPS signal received by the GPS antenna. As a result, the omnidirectional camera can be further miniaturized.

BRIEF DESCRIPTION OF THE DRAWINGS

FIG. 5A and FIG. 5B are explanatory views showing a difference between an acceleration received by an image center of the omnidirectional camera according to the embodiment of the present invention and an acceleration received by an inertial measurement unit.

DETAILED DESCRIPTION OF THE PREFERRED EMBODIMENT

Description will be given below on embodiments of the present invention by referring to the attached drawings.

Figure 1:
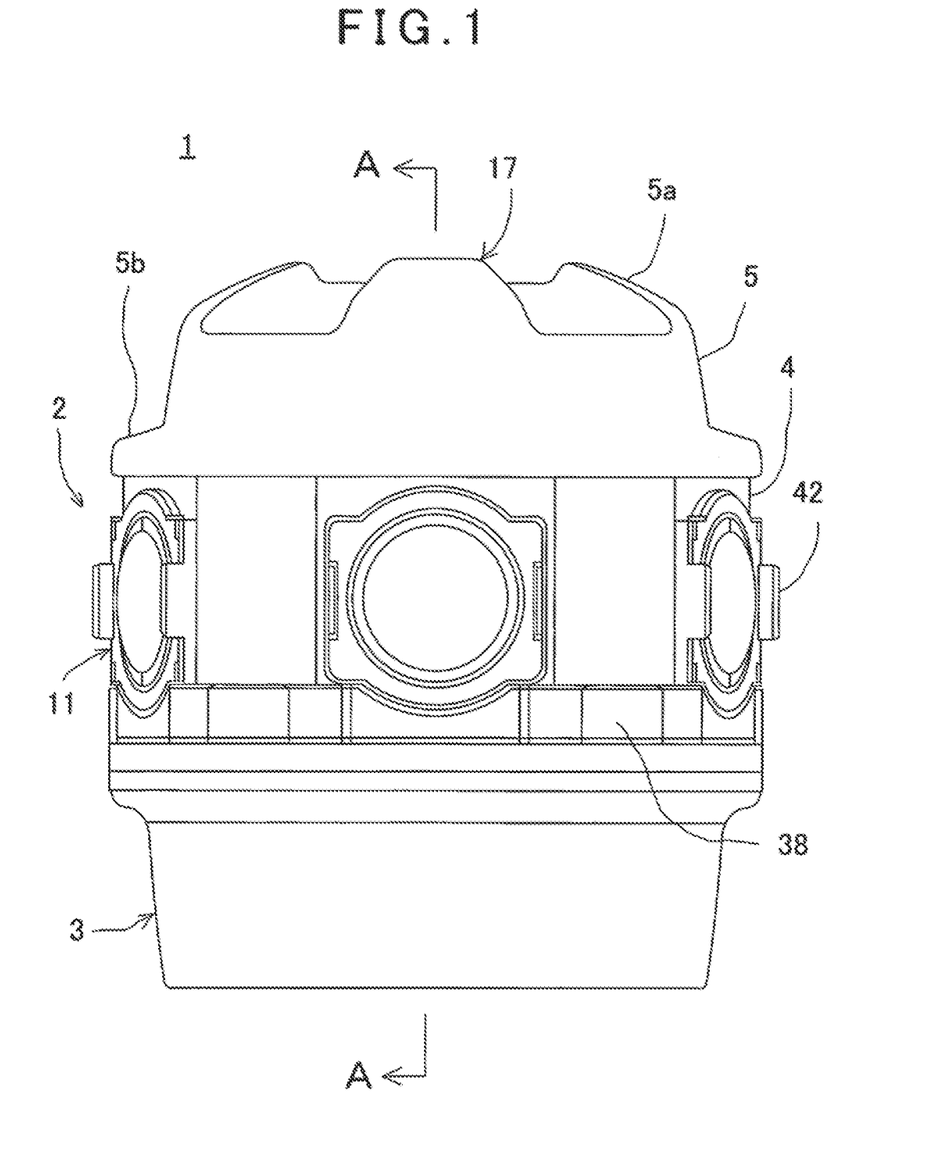
FIG. 1 is an elevational view of an omnidirectional camera according to an embodiment of the present invention.
Figure 2:
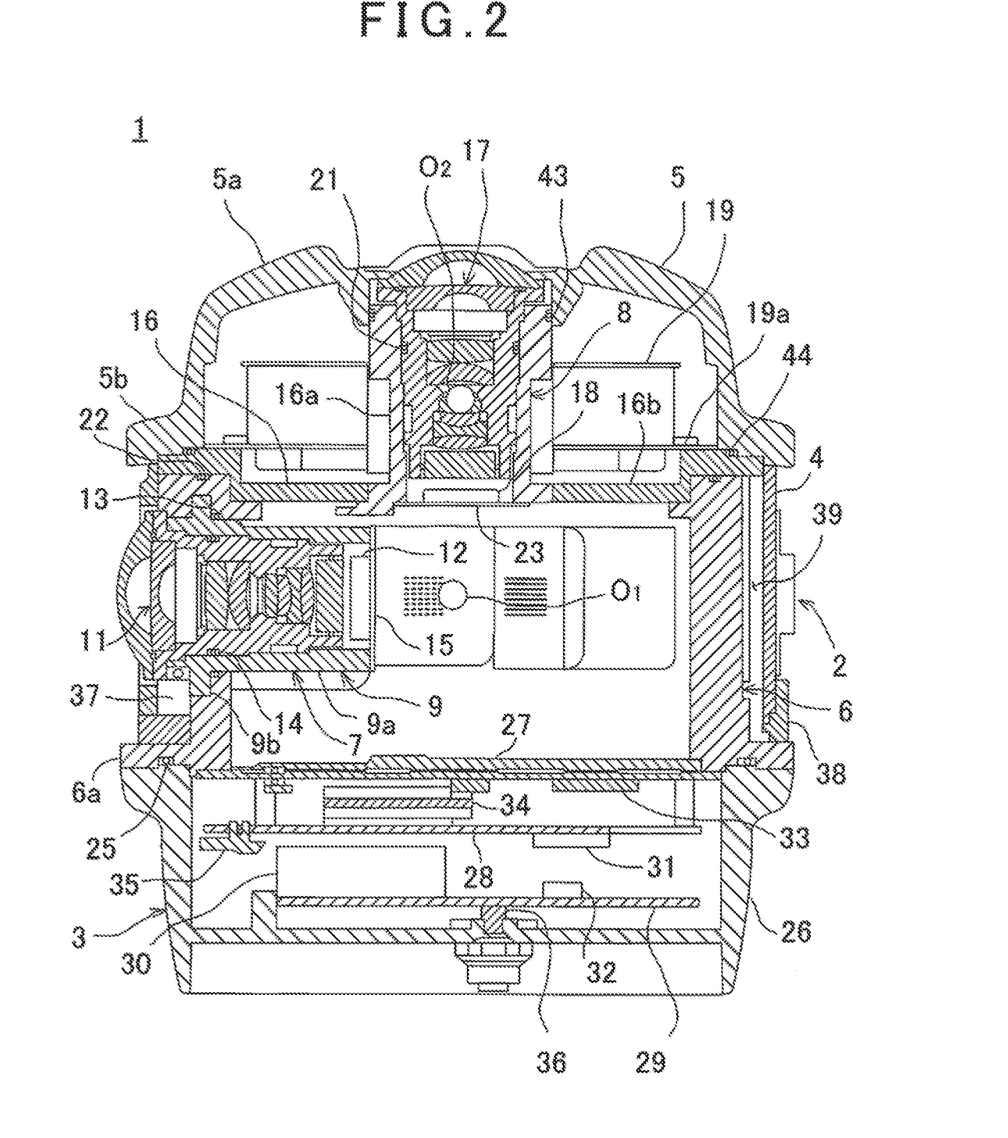
FIG. 2 is an arrow diagram along the line A-A in FIG. 1.
Figure 3:
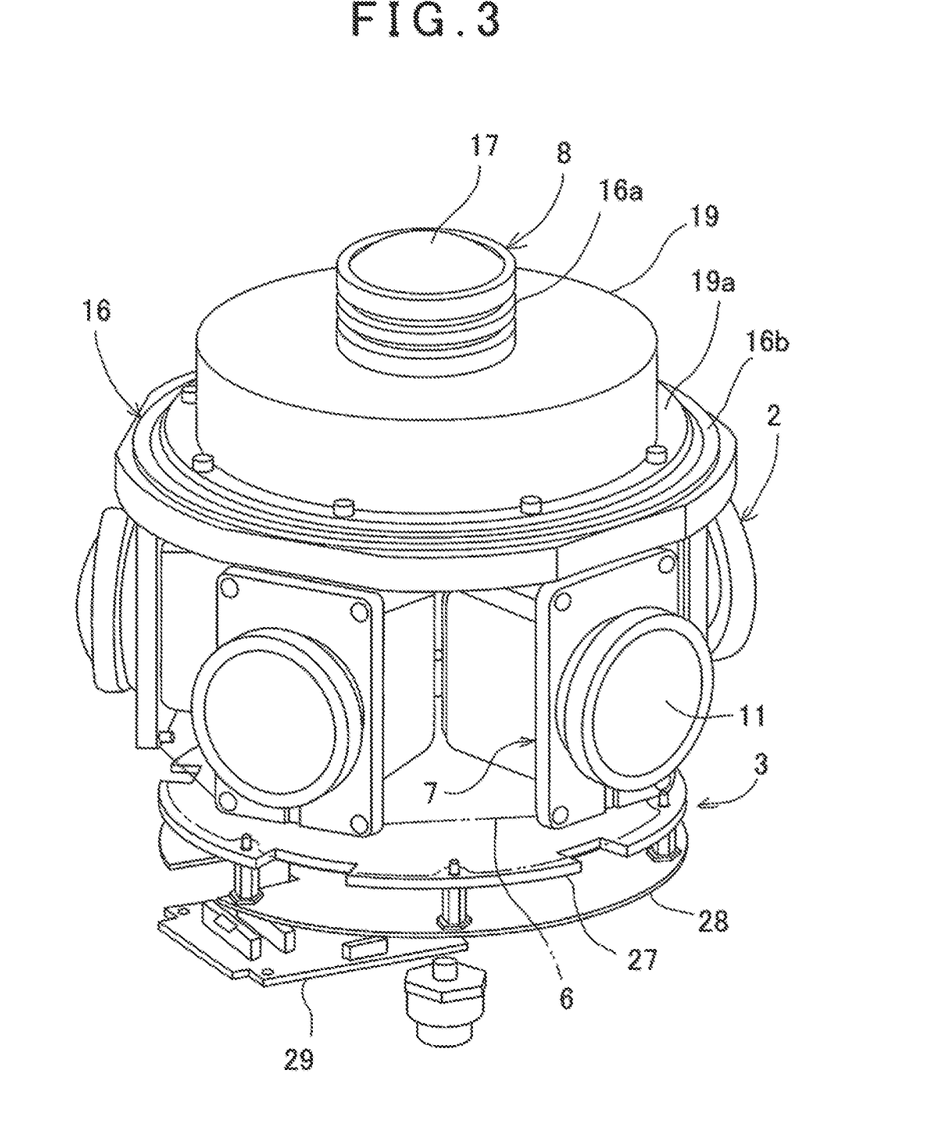
FIG. 3 is an exploded perspective view of the omnidirectional camera according to the embodiment of the present invention.

By referring to FIG. 1 to FIG. 3, description will be given on an omnidirectional camera according to an embodiment of the present invention.

The omnidirectional camera 1 mainly comprises a camera assembly 2, an image processing unit 3, a body portion cover 4, and an upper cover 5. The image processing unit 3 accommodates an image integrated circuit as an image reception unit, a positional detection integrated circuit as a positional information reception unit, and an electronic circuit or the like. The body portion cover 4 accommodates the camera assembly 2.

The camera assembly 2 has a camera mounting frame 6 made of a metal material with good heat transfer properties such as aluminum or copper and so on. The camera mounting frame 6 is a cylindrical hollow body, and a circular flange portion 6a is formed concentrically with the camera mounting frame 6 at a lower end. In the camera mounting frame 6, a total of five horizontal camera units 7 are present on the horizontal plane orthogonal to a center line of the camera mounting frame 6 and are arranged at a predetermined angle pitch, e.g. 72° pitch. Further, a vertical camera unit 8 is arranged at an upper end of the camera mounting frame 6 so as to coincide with the center line of the camera mounting frame 6. It is noted that the camera mounting frame 6 may be a cylindrical hollow body with a polygonal cross section.

The horizontal camera unit 7 comprises a first mount block 9, a horizontal lens unit 11 as inserted into the first mount block 9 from outside in the radial direction, and an image pickup element 12 as arranged at a focal position of the horizontal lens unit 11. The first mount block 9 is made of a material with good heat transfer properties, e.g. a metal material such as aluminum or copper or the like.

The first mount block 9 has a block portion 9a protruding toward the central side and a flange portion 9b bulging around the block portion 9a. The first mount block 9 is inserted from outside in such a manner that the block portion 9a penetrates the camera mounting frame 6. The flange portion 9b and the camera mounting frame 6 are closely fitted to each other by a metallic contact, and the flange portion 9b is secured to the camera mounting frame 6 by a securing means such as a bolt or the like. A seal ring 13 is interposed between the flange portion 9b and the camera mounting frame 6, and the liquid-tightness is maintained between the first mount block 9 and the camera mounting frame 6.

A seal ring 14 is interposed between the horizontal lens unit 11 and the first mount block 9, and the horizontal lens unit 11 is liquid-tightly supported. Also, the horizontal lens unit 11 itself has a liquid-tight structure.

A circuit board 15 is disposed to an inner end of the horizontal lens unit 11, and the image pickup element 12 is mounted on the circuit board 15. Further, a ground layer is formed on a front-side surface (that is a surface which is in contact with the first mount block 9) of the circuit board 15, and the circuit board 15 is in contact with the first mount block 9 through the ground layer.

The optical axes of the optical systems of the respective horizontal lens units 11 are allowed to cross each other at one point which is preferably a reference point $O_1$ positioned on the center line of the camera mounting frame 6. Thereby, the reference point $O_1$ is enabled to be a reference position of images acquired by all the horizontal camera units 7.

The vertical camera unit 8 comprises a second mount block 16, a vertical lens unit 17 as inserted into the second mount block 16 from above, and an image pickup element 18 as arranged at a focal position of the vertical lens unit 17. The second mount block 16 is made of a metal material with good heat transfer properties such as aluminum and so on.

Additionally, the second mount block 16 has a substantially discoid shape, and has a block portion 16 extending upward in the central portion and a circular flange portion 16b formed concentrically with the block portion 16a. On an upper surface of the flange portion 16b, a ring-like GPS antenna 19 is provided concentrically with the block portion 16a so as to surround the block portion 16a. The GPS antenna 19 has a circular flange portion 19a formed at a lower end, and the flange portion 19a is secured to the flange portion 16b by a securing means such as a bolt or the like.

A phase center of the GPS antenna 19 is a reference point $O_2$ positioned on the center line of the camera mounting frame 6, and a position, which is determined based on a GPS signal received by the GPS antenna 19, concerns the reference point $O_2$.

A seal ring 21 is interposed between the second mount block 16 and the vertical lens unit 17, and the liquid-tightness is maintained between the vertical lens unit 17 and the second mount block 16. It is noted that the vertical lens unit 17 itself also has a liquid-tight structure.

The second mount block 16 is provided so as to close an upper end opening of the camera mounting frame 6. The upper end of the camera mounting frame 6 and the flange portion 16b are closely fitted to each other by a metal contact, and the flange portion 16b is secured to the camera mounting frame 6 by the securing means such as a bolt or the like. A seal ring 22 is interposed between the upper end of the camera mounting frame 6 and the flange portion 16b, and the liquid-tightness is maintained between the camera mounting frame 6 and the second mount block 16.

A circuit board 23 is disposed to a lower surface of the second mount block 16, and the image pickup element 18 is mounted on the circuit board 23. Additionally, a ground layer is formed on an upper surface (that is a surface which is in contact with the second mount block 16) of the circuit board 23, and the circuit board 23 is in contact with the second mount block 16 through the ground layer.

The vertical camera unit 8 is arranged in such a manner that an optical axis of the vertical lens unit 17 is preferably positioned on the center line of the camera mounting frame 6. Thereby, the reference point $O_1$ is enabled to be a reference position of images acquired by the vertical camera unit 8.

Each of the horizontal lens unit 11 and the vertical lens unit 17 have a field angle of, e.g. 120° to 130° and images acquired by the horizontal camera units 7 and 7 which are adjacent to each other or by the horizontal camera unit 7 and the vertical camera unit 8 overlap each other.

The image processing unit 3 is provided on a lower surface of the flange portion 6a of the camera mounting frame 6. A seal ring 25 is interposed between the image processing unit 3 and the flange portion 6a, and the liquid-tightness is maintained between the image processing unit 3 and the camera mounting frame 6.

The image processing unit 3 comprises a bottom portion case 26, a first circuit board 27 accommodated in the bottom portion case 26, a second circuit board 28, an input/output circuit board 29, an inertial measurement unit (IMU) 30, an azimuth sensor 31, and a tilt sensor 32.

An image processing integrated circuit 33 is mounted on a back surface of the first circuit board 27, and the image processing integrated circuit 33 is electrically connected to the circuit board 15, the circuit board 23, the azimuth sensor 31, and the tilt sensor 32. The image data, which is acquired by the image pickup element 12 and the image pickup element 18, is input to the image processing integrated circuit 33, and also an azimuth detection signal from at least the azimuth sensor 31 of the azimuth sensor 31 and the tilt sensor 32 is input to the image processing integrated circuit 33. An azimuth detected by the azimuth sensor 31 coincides with a direction of an optical axis of an optical system of the horizontal camera unit 7, which serves as a reference among the horizontal camera units 7.

A positional detection integrated circuit 34 is mounted on a surface of the second circuit board 28 as provided below the first circuit board 27. The GPS antenna and the IMU 30 are electrically connected to the positional detection integrated circuit 34, and a GPS signal sent from the GPS antenna 19 is input to the positional detection integrated circuit 34, and also an IMU signal sent from the IMU 30 is input to the positional detection integrated circuit 34. The positional detection integrated circuit 34 calculates a coordinate position (the GPS positional information) of a reference point $O_2$ based on the GPS signal and also calculates a coordinate position (the IMU positional information) of a reference point $O_2$ based on the IMU signal. The IMU positional information is compensated based on the GPS positional information periodically or in real time, and the IMU positional information is used in a case where the GPS positional information cannot be acquired.

Further, an indicator 35, which displays a status, e.g., the number of satellites received by the GPS antenna 19 or whether a power source is turned on or the like, is provided on the second circuit board 28.

The input/output circuit board 29 is provided below the second circuit board 28, and various types of connectors 36 are mounted on a lower surface of the input/output circuit board 29. A hole is formed in a portion of the bottom portion case 26 facing the connector 36, and the connector 36 is connected to an external device such as a PC or the like via the hole by a predetermined connecting means, e.g. a USB cable and so on.

The camera assembly 2 constitutes a liquid-tight structure by the camera mounting frame 6, the horizontal camera units 7 mounted on the camera mounting frame 6, the vertical camera unit 8, and the image processing unit 3. Further, since the camera mounting frame 6, the first mount block 9, and the second mount block 16 are made of metal materials with good heat transfer properties, the camera assembly 2 itself has a function as a heat radiator.

The body portion cover 4 is made of a metal material with good heat transfer properties, e.g. aluminum or the like, and a lens hole 37 with a larger diameter than a forward end of the horizontal lens unit 11 is formed in the body portion cover 4. The horizontal lens unit 11 penetrates the body portion cover 4 through the lens hole 37, and the body portion cover 4 covers a peripheral surface of the camera mounting frame 6.

Also, a plurality of fixing members 38 each having an arc-like curved surface are provided on an upper surface of the flange portion 6a by bolts or the like. The body portion cover 4 is sandwiched between the fixing member 38 and a flange portion 5b (to be described later) of the upper cover 5, and a space 39 is formed between the camera mounting frame 6 and the body portion cover 4.

A lens hood 42 is fitted to the body portion cover 4 concentrically with the lens hole 37. The lens hood 42 has a substantially rectangular outer shape, and a hole with the same diameter as the lens hole 37 is formed at the center of the lens hood 42. A maximum height of each lens hood 42 (a height from the body portion cover 4) is higher than a height of a maximum protruding portion of the horizontal lens unit 11.

The upper cover 5 is made of an insulator, e.g. a plastic, and has a dome portion 5a and a circular flange portion 5b formed at a lower end of the dome portion 5a. The dome portion 5a accommodates the vertical camera unit 8 and the GPS antenna 19, and the flange portion 5b is secured to the second mount block 16 by the securing means such as a bolt or the like.

Also, a seal ring 43 is interposed between the dome portion 5a and the block portion 16a, and a seal ring 44 is interposed between the flange portion 5b and the flange portion 16b, and the liquid-tightness is maintained between the upper cover 5 and the second mount block 16.

Further, a lens hole (not shown) is concentrically formed with an optical axis of the vertical camera unit 8 at a portion of the dome portion 5a corresponding to the vertical camera unit 8. A diameter of the lens hole is larger than a diameter of the end portion of the vertical lens unit 17, and a gap is formed around the vertical lens unit 17.

A lens hood (not shown) is disposed to the dome portion 5a concentrically with the lens hole similarly to the body portion cover 4.

Since the lens hoods are provided to the body portion cover 4 and the dome portion 5a, respectively, when the omnidirectional camera 1 falls, the lens hoods protect the horizontal lens units 11 and the vertical lens unit 17, and the lenses are prevented from being scratched or damaged.

Figure 4:
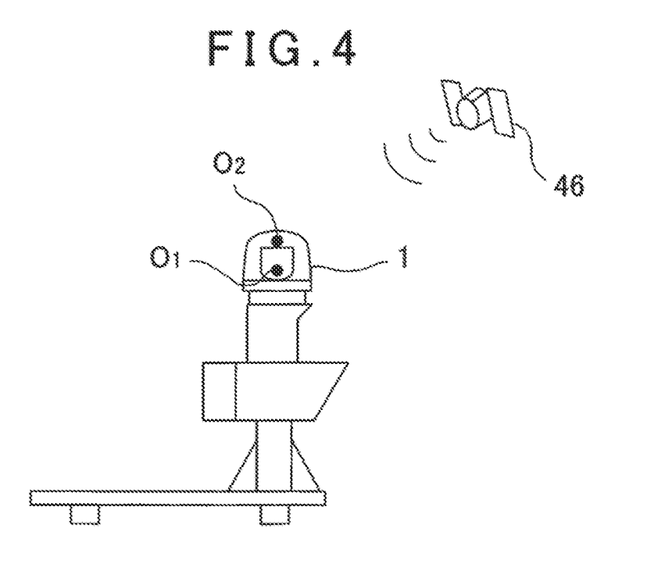
FIG. 4 is an explanatory view showing a case where the omnidirectional camera according to the embodiment of the present invention is mounted.

Next, description will be given on an acquisition of an image and a positional information using the omnidirectional camera 1. FIG. 4 shows a case where the omnidirectional camera 1 is mounted to a mobile object such as a mobile vehicle. Also, in FIG. 4, the mobile vehicle is omitted.

When an image acquisition processing begins, images of all-direction with the reference point $O_1$ as a reference are acquired by the horizontal camera units 7 and the vertical camera unit 8, and the acquired image data is input to the image processing integrated circuit 33 as image digital signals. Also, an azimuth detection signal from the azimuth sensor 31 is input to the image processing integrated circuit 33, and the acquired image is associated with any camera respectively, which has been used for the acquisition, selected from the horizontal camera units 7 and the vertical camera unit 8. It is noted that an initial setting or an initial standardization such as a calibration or the like is completed with respect to each of the horizontal camera unit 7 and the vertical camera unit 8 in advance before the image acquisition processing is executed.

Additionally, the GPS antenna 19 constantly receives the GPS signal from a satellite 46, and the positional detection integrated circuit 34 calculates a global coordinate position, i.e. a present position of the reference point $O_2$ (the GPS positional information) which is a phase center of the GPS antenna 19 based on the GPS signal. Further, in a case where the omnidirectional camera 1 is hidden behind a building or a mountain or the like and the GPS signal cannot be received, the positional detection integrated circuit 34 calculates a present position of the reference point $O_2$ (the IMU positional information) based on the GPS positional information at a moment when the receiving of the GPS signal became impossible and the IMU signal constantly received from the IMU 30.

Finally, the image processing integrated circuit 33 and the positional detection integrated circuit 34 associate the azimuth signal detected by the azimuth sensor 31, the acquired images acquired by the horizontal camera units 7 and the vertical camera unit 8, and the present position of the reference point $O_2$ calculated by the positional detection integrated circuit 34 with each other, and each obtained result is output to an external PC (not shown) via the connector 36 in time series.

As described above, in the present embodiment, since the vertical camera unit 8 is provided above the horizontal camera units 7 and the cylindrical GPS antenna 19 is arranged so as to surround the vertical camera unit 8, any other member, e.g., the GPS antenna 19 can be prevented from being reflected in an acquired image, a viewing field cannot be obstructed, and omnidirectional images with no deficiency except a lower portion can be acquired.

Further, since the GPS antenna 19 has the ring-like shape and is provided so as to cover the vertical camera unit 8, a space for providing the GPS antenna 19 does not have to be additionally prepared, and the omnidirectional camera 1 can be miniaturized.

Further, since the GPS antenna 19 is accommodated in the omnidirectional camera 1, a positional relationship between the reference point $O_1$ which is the image center of the horizontal camera units 7 and the vertical camera unit 8 and the reference point $O_2$ which is the phase center of the GPS antenna 19 is fixed. Therefore, a relative positional relationship can be prevented from varying between the horizontal camera units 7, the vertical camera unit 8, and the GPS antenna 19 every time the installation and the measurement are carried out.

Further, since both the reference point $O_1$ and the reference point $O_2$ are positioned on the center line of the camera mounting frame 6, the image center and the phase center can be prevented from being displaced when the mobile vehicle such as a car changes its direction.

Figure 5A:
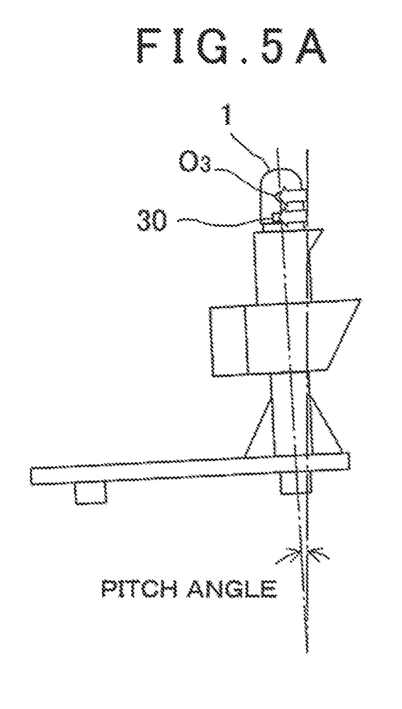
FIG. 5A shows a difference between pitch angles when acceleration and deceleration are carried out and FIG. 5B shows a difference between roll angles when turning is carried out.
Figure 5B:
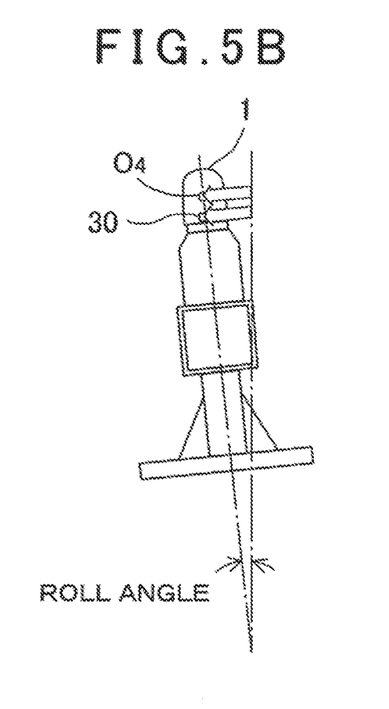

Additionally, since the IMU 30 is accommodated in the omnidirectional camera 1, a distance between the center of the omnidirectional camera 1 and the IMU 30 is reduced. Therefore, when the mobile object such as a vehicle with the omnidirectional camera 1 accelerates/decelerates, a difference between a pitch center $O_3$ of the omnidirectional camera 1 and a pitch angle of the IMU 30 (see FIG. 5A) is decreased, and when the mobile object turns, a difference between a roll center $O_4$ of the omnidirectional camera 1 and a roll angle of the IMU 30 (see FIG. 5B) is decreased. As a result, a difference between the acceleration received by the omnidirectional camera 1 and the acceleration received by the IMU 30 is reduced, so a measurement accuracy of the acceleration received by the omnidirectional camera 1 can be improved.

Figure 6:
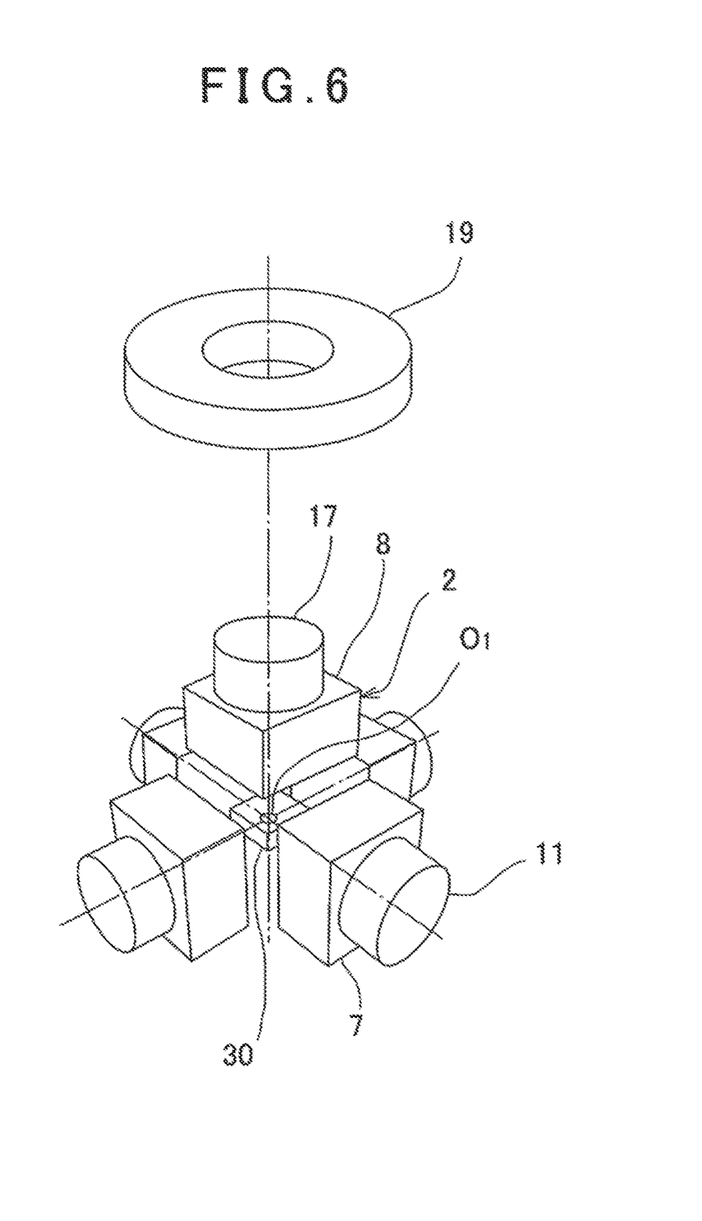
FIG. 6 is a schematic perspective view showing a variation example of the present invention.

As shown in FIG. 6, the IMU 30 may be provided at the reference point $O_1$ which is a lower layer center of the horizontal camera units 7 and the vertical camera unit 8. By providing the IMU 30 at the reference point $O_1$, the distance between the center of the omnidirectional camera 1 and the IMU 30 is further reduced, and the measurement accuracy of the acceleration received by the omnidirectional camera 1 can be further improved.

Further, in the present embodiment, since the camera mounting frame 6 and the first mount block 9 are made of metal materials with good heat transfer properties, during the image acquisition processing, a heat generated from the image pickup element 12 which is one of heat generating members is transferred to the block portion 9a from the ground layer of the circuit board 15, and is further transferred to the camera mounting frame 6 from the flange portion 9b. The first mount block 9 and the camera mounting frame 6 serve as heat radiators, and the heat is radiated into the space 39 from the surface of the flange portion 9b and the surface of the camera mounting frame 6.

Further, since the second mount block 16 and the body portion cover 4 are made of metal materials with good heat transfer properties, during the image acquisition processing, a heat generated from the image pickup element 18 which is one of heat generating members is transferred to the block portion 16a from the ground layer of the circuit board 23, and is further transferred to the flange portion 16b. The heat transferred to the flange portion 16b is transferred to the body portion cover 4 and is radiated into the atmosphere from the surface of the body portion cover 4, and a part of the heat is also transferred to the camera mounting frame 6 and is radiated from the camera mounting frame 6.

Therefore, the heat from the camera mounting frame 6, the first mount block 9, and the second mount block 16 can be effectively radiated to the outside.

The invention claimed is:

1. An omnidirectional camera comprising a camera mounting frame of cylindrical hollow body, a plurality of horizontal camera units adapted to acquire an image in a horizontal direction, a vertical camera unit adapted to acquire an image in a zenith direction, and a GPS antenna provided so as to surround said vertical camera unit, wherein said horizontal camera units are arranged so that optical axis of said horizontal camera units exist on a horizontal plane orthogonal to a center line of said camera mounting frame and coincide with one point of a reference point positioned on said center line of said camera mounting frame and said vertical camera unit is concentric with said GPS antenna, penetrates a central portion of said GPS antenna and is arranged so that an optical axis of said vertical camera unit coincides with said center line of said camera mounting frame and said reference point is set as a reference position of images acquired by all cameras of said horizontal camera units and said vertical camera unit, and wherein said GPS antenna is provided so that a phase center of said GPS antenna is positioned on said center line of said camera mounting frame.

2. An omnidirectional camera according to claim 1, wherein an image processing unit is provided at a lower surface of said camera mounting frame and said omnidirectional camera further comprises an inertial measurement unit accommodated in said image processing unit.

3. An omnidirectional camera according to claim 1, further comprising a positional information receiving unit that calculates a coordinate of said phase center of said GPS antenna based on a GPS signal received by said GPS antenna.

4. An omnidirectional camera according to claim 1, wherein said inertial measurement unit is provided at said reference point.

5. An omnidirectional camera according to claim 1, wherein an upper cover is liquid-tightly provided at said camera mounting frame, a bottom portion case is liquid-tightly provided at said camera mounting frame and said vertical camera unit and said GPS antenna are liquid-tightly accommodated in said upper cover, and wherein said horizontal camera units are liquid-tightly accommodated in said camera mounting frame and said image processing unit, including an image integrated circuit, is liquid-tightly accommodated in said bottom portion case.

* * * * *